United States Patent [19]

Homer

[11] Patent Number: 5,212,003
[45] Date of Patent: May 18, 1993

[54] LOW STRESS PANEL JOINTS
[75] Inventor: Peter K. Homer, Langhorne, Pa.
[73] Assignee: General Electric Co., East Windsor, N.J.
[21] Appl. No.: 824,807
[22] Filed: Jan. 22, 1992
[51] Int. Cl.[5] ............................ B32B 3/12; B32B 3/06
[52] U.S. Cl. ...................................... 428/57; 428/116; 428/194; 52/582
[58] Field of Search ......................... 428/57, 116, 194; 52/582

Primary Examiner—Alexander S. Thomas
Attorney, Agent, or Firm—William H. Meise; Stephen A. Young; Clement A. Berard

[57] ABSTRACT

First and second sandwich panels each have first and second face sheets, held in a mutually parallel, spaced-apart relationship by a low-density core. The panels are joined along an edge, which may be curved. The joinder is made by a plurality of thin, flat "L"-shaped joining pieces, each having first and second legs, which may be at skew angles if the panels are joined at skew angles. The first leg of the first joining piece is affixed, as by adhesive, to the first face sheet of the first panel and to the exposed core of the second panel, and the second leg of the first joining piece is affixed to the second face sheet of the second panel. The second joining piece, adjacent the first, has its first leg affixed to the first face sheet of the second panel and to the exposed core of the first panel, and its second leg affixed to the second face sheet of the first panel. Other additional fasteners may alternate along the length of the edge to be joined. In a particular embodiment, the first legs of the joining pieces are coupled in common.

11 Claims, 6 Drawing Sheets

LOW STRESS PANEL JOINTS

BACKGROUND OF THE INVENTION

This invention relates to an arrangement for joining the edges of lightweight panels, and more particularly to adhesively connected joints with reduced likelihood of peeling failures.

Figure 1A:
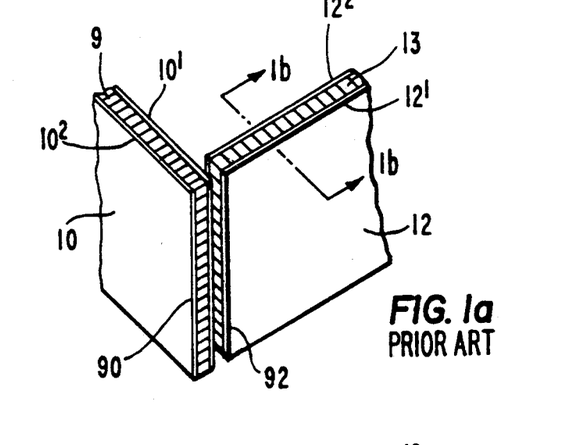
FIG. 1a is a perspective or isometric view of two panels to be joined as in the prior art.
Figure 1B:
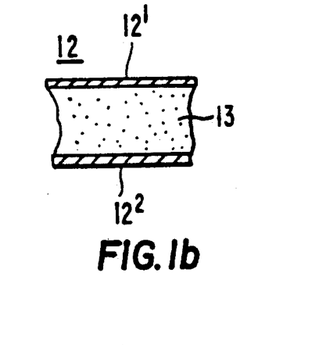
FIG. 1b is a cross-section of a panel illustrating the sandwich construction.

Aircraft and spacecraft structures are required to have relatively high strength in combination with light weight. Such structures may be made from panels, such as panels 10 and 12 of FIG. 1a, joined along one or more edges. For improved stiffness, such a structural panel is often made with a pair of parallel sheets of relatively high-strength, load-bearing material, held in a spaced-apart relationship by a lightweight, low density core. Such panels are often known as "sandwich" panels. The core of such panels holds the load-bearing sheets in a relationship for making the best use of their strength, much as the web of an I-beam holds the principal load-bearing flanges. In FIG. 1a, panel 10 includes first and second "face" sheets or plates $10^1$ and $10^2$ of aluminum, held together by an aluminum honeycomb 9. Face sheets $10^1$ and $10^2$ are adhesively bonded to honeycomb core 9. Similarly, a second sandwich panel 12 includes load-bearing aluminum face sheets $12^1$ and $12^2$, held in a parallel, spaced-apart relationship by honeycomb core 13. FIG. 1b is a cross-section of panel 12 of FIG. 1a, illustrating the honeycomb 13 by stippling. Panels 10 and 12 of FIG. 1 may be joined along their juxtaposed edges 90 and 92.

A variety of panel fastening methods have been used in the past. One of the difficulties associated with joining sandwich panels such as panels 10 and 12 of FIG. 1a is the relative ease with which the low-density core can be crushed, which means that simple techniques using compression fasteners such as bolts may not be reliable. Therefore, bolted structures of sandwich panels may require reinforcement in the region of the bolts, which tends to increase the weight of the structure.

Figure 2A:
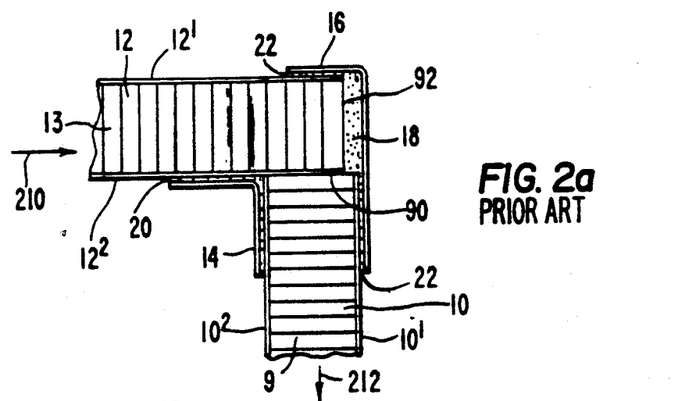
FIG. 2a is a cross-sectional view of the two panels of FIG. 1 joined in accordance with the prior art.

The need to use bolts to fasten sandwich panels is eliminated by the use of adhesive fastening techniques. FIG. 2a illustrates portions of two panels 10 and 12, in which the end or edge 90 of panel 10 is butted against the side of panel 12 adjacent its edge 92. As illustrated in FIG. 2a, skin $12^2$ of panel 12 lies adjacent to core 9 of panel 10 in the abutting region. Simple adhesive fastening of the core and face sheet edges of panel 10 to the skin of panel 12 may not result in a high-strength joint, because low density core 9 of panel 10 may not have sufficient strength by itself to adequately transfer loads. Also, such an adhesive fastening method connects only the edges of face sheets $10^1$ and $10^2$ to the side of face sheet $12^2$ of panel 12. The edges of face sheets $10^1$ and $10^2$ which are adjacent to face sheet $12^2$ of panel 12 have such a small area that even a strong adhesive will provide a relatively feeble bond. The prior art arrangement of FIG. 2a improves upon such a simple adhesively connected butt connection by providing reinforcing corners, illustrated as 14 and 16. These corners may be made from the same material as the face sheets, in the example aluminum plate. Inside corner reinforcement 14 is adhesively connected to face sheet $12^2$ of panel 12 and to face sheet $10^2$ of panel 10 by an adhesive bond illustrated as 20. Similarly, outside corner reinforcement 16 is adhesively bonded to face sheets $12^1$ of panel 12 and $10^1$ of panel 10 by an adhesive bond illustrated as 22. Outside corner reinforcement 16 is also adhesively bonded to core 13 of panel 12 by an adhesive mass illustrated as 18. As illustrated in FIG. 2a, core 13 is a honeycomb, and therefore the exposed edge of core 13 which faces outside corner reinforcement 16 includes voids, which are filled by adhesive mass 18. As is known to those skilled in the art, inside corner reinforcement 14 and outside corner reinforcement 16 are spaced away from the adjacent stress-carrying sheets or skins of the panels, as by mixing hollow 5 mil (0.005 inch) glass beads with the adhesive prior to its application, to maintain a 5 mil spacing to guarantee that the adhesive is not squeezed from the joint, to maintain the strength of the adhesive. Other spacing methods are well known, as for example, use of a mesh screen or scrim, which also prevents the adhesive from being squeezed from between the structural members being bonded.

In FIG. 2a, forces applied in the direction of arrow 210 to panel 12 are resisted by panel 10, and results in a shear force along the bonded edge. Corner reinforcement 14 has a relatively large bond area 20 with face sheet $12^2$, and bears directly against face sheet $10^2$. The shear force represented by arrow 210 is resisted by the panel adhesive bond generally, and in particular by inside corner reinforcement 14, with some assistance from outside corner reinforcement 16. Forces tending to pull panel 10 away from panel 12, such as force in the direction of arrow 212 of FIG. 2a, results in a tensile force at the bonded edge. Outside corner reinforcement 16 has a relatively large bond area 22 with face sheet $10^1$ of panel 10, and bears directly against face sheet $12^1$ of panel 12. The tensile force represented by arrow 212 tends to be resisted by the panel adhesive bond generally, and in particular by outside corner reinforcement 16, with some assistance from inside corner reinforcement 14.

Figure 2B:
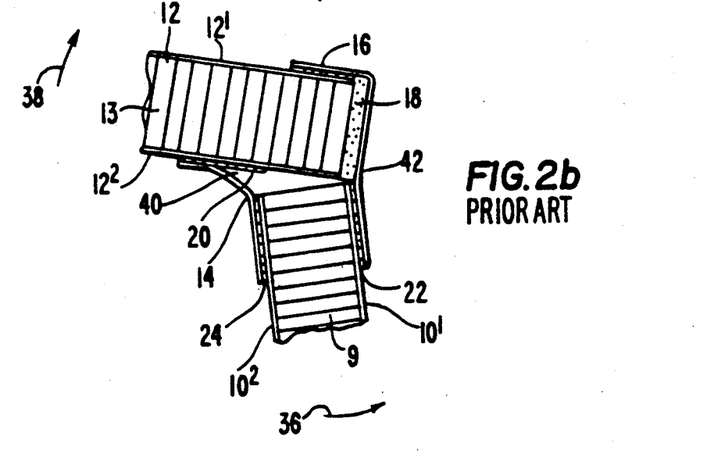

It has been found that when rotational moments, illustrated in FIG. 2b by arrows 36 and 38, are applied to a structure similar to that of FIG. 2a, a "peeling" failure may result. FIG. 2b illustrates such a failure. In FIG. 2b, elements corresponding to those of FIG. 2a are designated by the same reference numerals. In FIG. 2b, the moments represented by arrows 36 and 38 tend to bend outside corner reinforcing element 16 at a point 42, and to bend inside reinforcing element 14 while causing its inside corner to pull away from the adjacent adhesive, leaving a gap or cavity illustrated as 40. Once reinforcing element 14 has peeled away from stress-carrying face sheet $12^2$, reinforcing element 14 can not provide as much support against simple shear forces because at least a part of its adhesive bond has failed.

An improved fastening method is desired.

SUMMARY OF THE INVENTION

A structure includes a pair of sandwich panels joined along edges thereof. Each panel includes first and second face sheets and a core. Thin, flat joining pieces are provided, which are bent into a generally "L" shape, with the angle between legs or segments equal to the angle which the face sheets of the panels to be fastened make in the abutting region. First ones of the joining pieces have first legs affixed to the first face sheet of the first panel and to the exposed core of the second panel, and second legs affixed to the second face sheet of the second panel. Other ones of the joining pieces have first legs affixed to the first face sheet of the second panel and to the exposed core of the first panel, and second legs affixed to the second face sheet of the first panel. In some embodiments, the edges are curved.

DESCRIPTION OF THE DRAWING

FIG. 2b illustrates the type of failure resulting from the application of moments to the joint of FIG. 2a;

FIG. 3b is a plan view of the joint of FIG. 3a, and FIG. 3c is a perspective or isometric view of a joining element in accordance with the invention, which is used in the arrangements of FIGS. 3a and 3b.

FIG. 4b is a perspective or isometric view, partially in phantom, illustrating an assembly using the joining element of FIG. 4a;

FIG. 5b illustrates a joining element which may be used in the arrangement of FIG. 5a if few elements are to be used, FIG. 5c illustrates the joining of a plurality of elements for use with the lid of FIG. 5a, and FIG. 5d illustrates the joining of a plurality of elements for use with the cylindrical container of FIG. 5a;

DESCRIPTION OF THE INVENTION

Figure 3A:
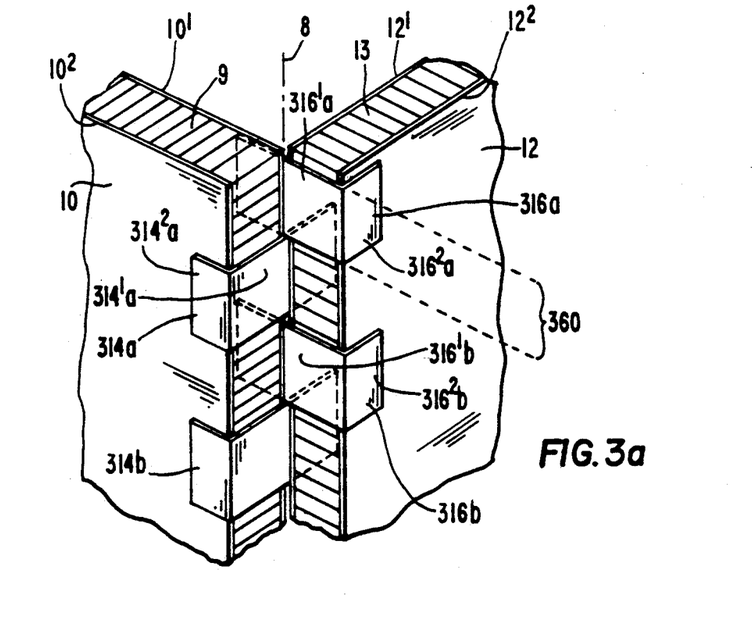
FIG. 3a is a perspective or isometric of two panels joined in a manner in accordance with the invention.
Figure 3B:
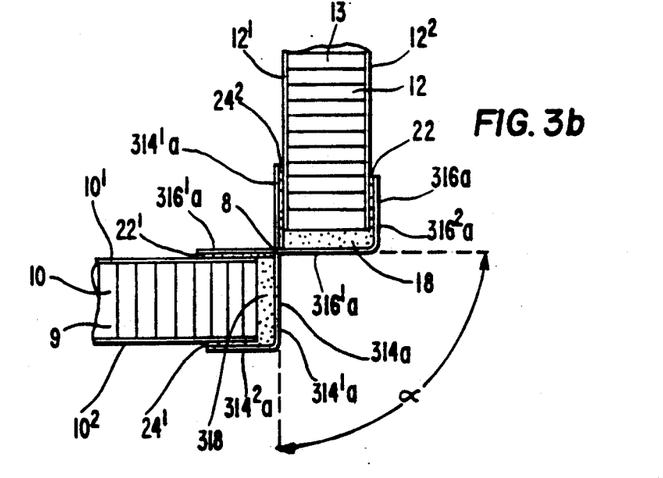

As illustrated in FIGS. 3a and 3b, panels 10 and 12 are joined at right angles or with a 90° included angle $\alpha$ therebetween. Also, the joined edges are themselves cut at the same 90° angle. The angle of the "cut" at the edge of the panels being joined is significant for reasons which are explained below.

Figure 3C:
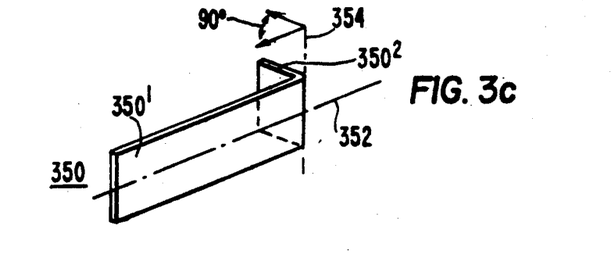

In FIGS. 3a and 3b, the panels are held along a "line" represented as an axis 8. The jointure is provided by a plurality of L-shaped joining elements designed 314 and 316 in FIGS. 3a and 3b. Joining elements 314 and 316 are identical, and are designated by different numbers 314 and 316 to represent their different positions in the joint. More particularly, a generic fastening element 350 is illustrated in FIG. 3c. In FIG. 3c, it can be seen that joining element 350 is formed as a thin, flat strip having an axis of elongation 352, with a bend along a line 354 orthogonal to axis of elongation 352. The leg or segment of fastening element 350 which is parallel of axis of elongation 352 is designated $350^1$, and the leg which is orthogonal thereto is designated $350^2$. The superscript 1 designation in relation to a fastening element denotes the longer leg, if a leg be longer, and the superscript 2 represents the shorter leg. As described below, the difference between the lengths of legs $350^1$ and $350^2$ equals the thickness of the sandwich panel with which the joining element is associated.

Referring once again to FIG. 3a, joining element $316a$ has its shorter leg $316^2a$ adhesively bonded to load-carrying sheet $12^2$ of panel 12, and a portion of its longer leg $316^1a$ bonded to the load-bearing sheet $10^1$ of panel 10. Also, another portion of longer leg $316^1a$ of joining element $316a$ is bonded to core 13 of panel 12. Similarly, joining element $314a$ has its shorter leg $314^2a$ bonded to load-bearing surface $10^2$ of panel 10, and a portion of its longer leg $314^1a$ bonded to load-bearing surface $12^1$ of panel 12. Also, another portion of longer leg $314^1a$ of joining element $314a$ is bonded to core 9 of panel 10. A third joining element $316b$ has its shorter leg $316^2b$ and its longer leg $316^1b$ bonded in the same manner as those of the first-mentioned joining piece $316a$, and a fourth joining element $314b$ is bonded in a manner similar to that of joining element $314a$. It will be clear that as many joining elements 350 may be used as the length of the sides being joined permits.

Referring now to FIG. 3b, which is a plan view of the structure of FIG. 3a, joining element $316^2a$ can be seen to be bonded to load-bearing sheet $12^2$ of panel 12 by a layer of adhesive $22^2$. Similarly, portion $316^1a$ of joining element $316a$ is bonded to load-bearing sheet $10^1$ of panel 10 by a layer $22^1$ of adhesive. As mentioned above, it is important that beads, a scrim or other method be used to prevent the adhesive from being squeezed out of the joint before curing. In FIG. 3b, that portion of leg $316^1a$ of joining element $316a$ which lies adjacent to core 13 of panel 12 is also adhesively bonded to the core. In this case, the core is a honeycomb, as described above, and as a result interstices exist between leg $316^1a$ and the core, which are filled by adhesive 18. Similarly, joining element $314a$ has its shorter leg $314^2a$ adhesively bonded to load-bearing surface $10^2$ by a layer 24 of adhesive, and a portion of its longer leg $314^1a$ which lies adjacent to the surface of load-bearing sheet $12^1$ of panel 12 adhesively bonded by a layer of adhesive $24^2$. As in the case of panel 12, the core 9 of panel 10 is a honeycomb, and an adhesive mass 318 fills interstices between the honeycomb and the adjacent portion of leg $314^1a$ of joining element $314a$.

With the arrangement as so far described, the stiffness of the joining elements resists moments, but if moments occur which exceed the yield strength of the joining elements, they merely bend, but do not delaminate or separate from the adjacent face sheet as was the case in the prior art. Thus, the structure in accordance with the invention maintains essentially its full strength even after the application of a bending moment which, in the prior art, might cause delamination.

Figure 3D:
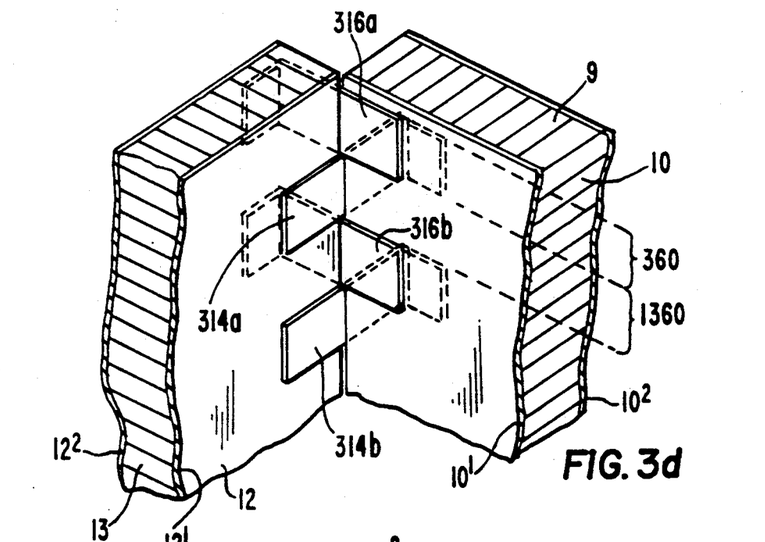
FIG. 3d is a view of the joint of FIG. 3a from another vantage point.
Figure 3E:
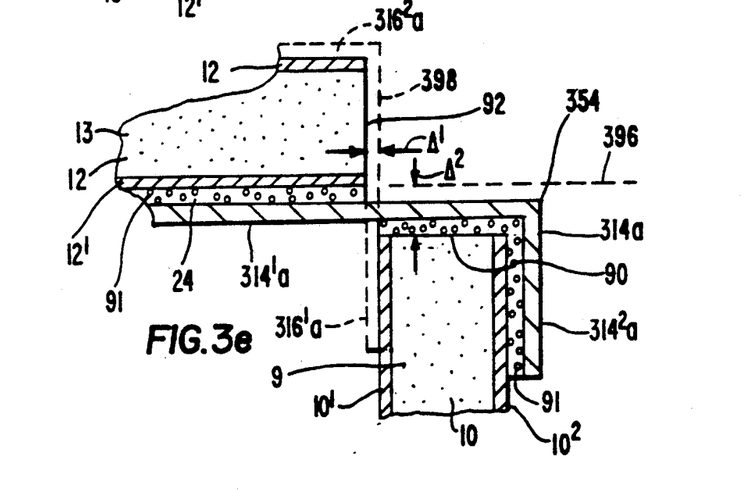
FIG. 3e illustrates details of the joint of FIGS. 3a, 3b and 3d, FIGS. 3a, 3b, 3c, 3d and 3e are referred to jointly as FIG. 3.

FIG. 3d is a view of the structure of FIG. 3a, seen from the side with the smaller included angle between the panels. FIG. 3e illustrates details of the joint of joining element $314a$ of FIG. 3a. As illustrated in FIG. 3e, adhesive 24 includes a plurality of glass beads, some of which are designated as 90, to provide the proper spacing. Also in FIG. 3e, the two legs $316^1a$ and $316^2a$ of joining element $316a$ are illustrated in phantom view. The space required for joining element $316a$, and other like joining elements, results in a separation or spacing, illustrated as $\Delta^1$, between the projection 398 of the plane of the outside surface of face sheet $10^1$ of panel 10, and the end "surface" or "edge" 92 of panel 12. The dimension $\Delta^1$ is equal to the thickness of joining piece 316a, together with its adjacent adhesive bonds, which to a first approximation is simply the thickness of the joining piece. Similarly, the end "surface" or "edge" 90 of panel 10 is spaced away from the projection 396 of the exterior surface of face sheet 12 of panel 12 by a distance $\Delta^2$. Thus, while the panels are joined along their edges, the projection of the plane of one panel never actually intersects the other panel, at least in the region of the joint.

Figure 7A:
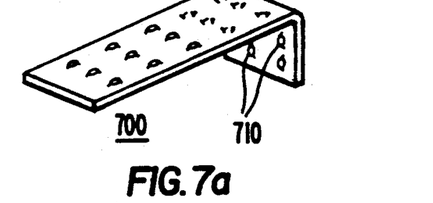
FIGS. 7a and 7b illustrate a perforated or dimpled joining element which provides inherent spacing.
Figure 7B:
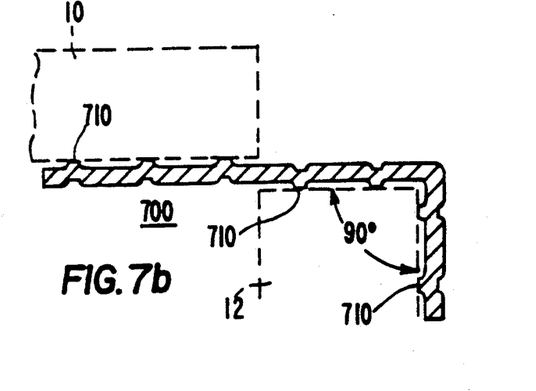

FIGS. 7a and 7b are perspective or isometric, and cross-sectional views, respectively, of a joining piece 700 which is perforated or dimpled to produce extruded "bumps", some of which are represented as 710, which space the edge of the joining piece away from the adjacent surfaces, thereby eliminating the need for microspheres or a scrim.

Figure 4A:
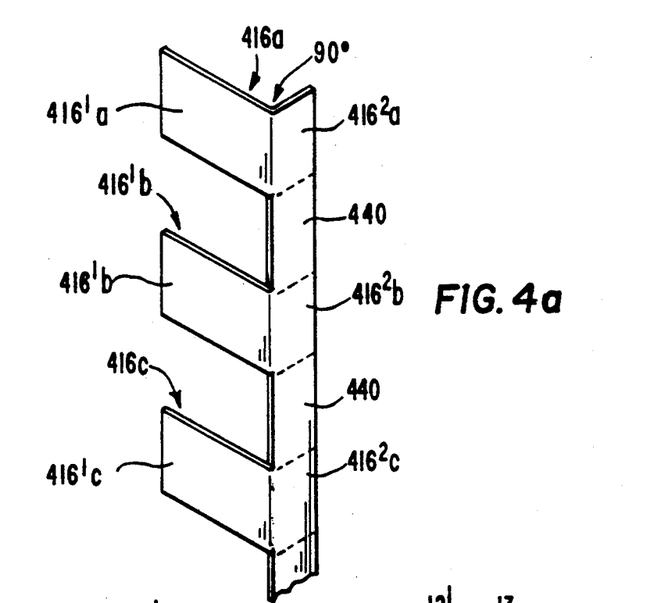
FIG. 4a illustrates in perspective or isometric view another embodiment of the joining elements in accordance with the invention.
Figure 4B:
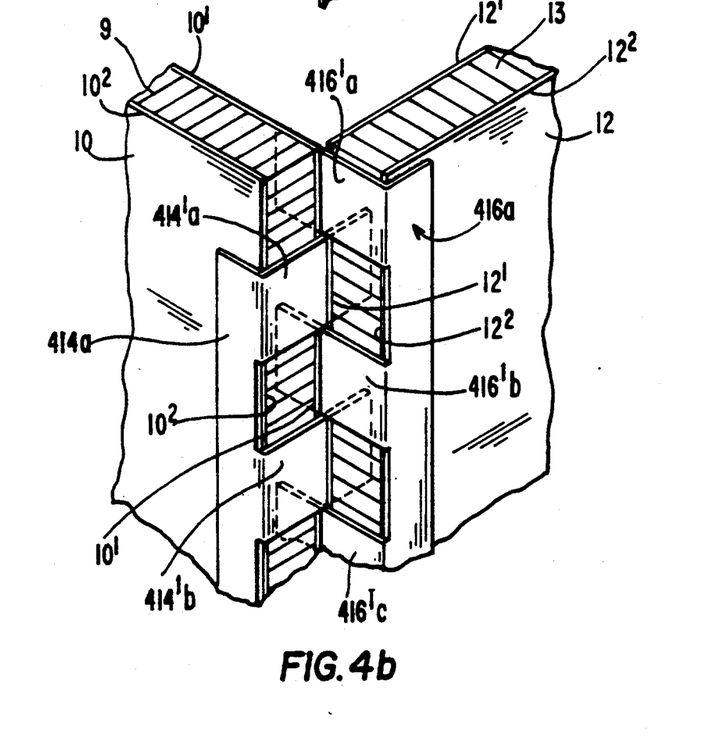

FIG. 4a is a perspective or isometric view of another embodiment of the invention which is useful in reducing the parts count and simplifying handling. In FIG. 4a, the structure may be conceived of as a plurality of joining elements 416a, 416b, 416c . . . similar to those of FIG. 3, each including its longer portion $416^1b$, $416^2b$, and $416^3b$, and each joining piece also including a shorter leg $416^2a$, $416^2b$, and $416^2c$, all of which shorter legs are joined together by a plurality of elements 440 to form a continuous serrated structure, in which portions $416^1a, b, c$ . . . are spaced apart by an amount substantially equal to their widths. FIG. 4b illustrates two serrated joining structures similar to that of FIG. 4a, bonded to panels 10 and 12 to produce an overall structure corresponding to that of FIG. 3a. The additional bonding area should provide greater strength.

Figure 5A:
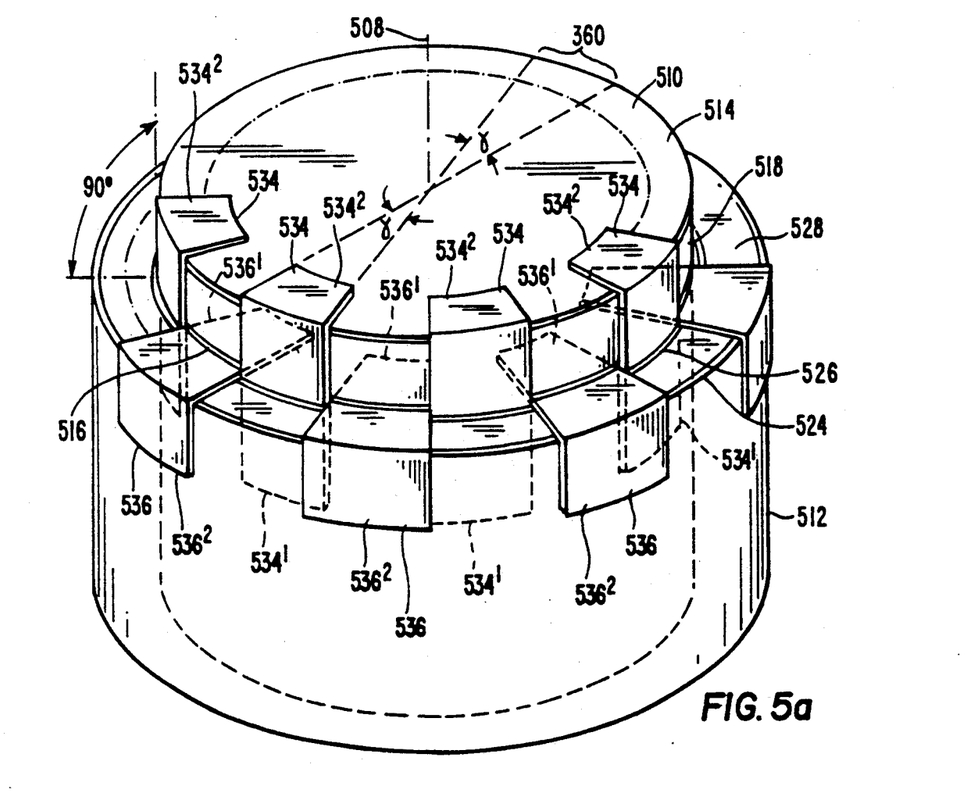
FIG. 5a illustrates a joint in accordance with the invention made on a curved surface of a circular lid on a cylindrical container.

FIG. 5a illustrates the joinder of a curved surface to a flat surface, in the context of the joining of a flat lid 510 to a cylindrical container 512. Flat lid 510 includes upper and lower load-bearing face sheets 514 and 516, respectively, separated by a low-density core 518. Similarly, the sides of cylindrical container 512 are formed from load-bearing outer and inner face sheets 524 and 526, respectively, separated by a low-density core 528. Within a small angular increment about axis 508, such as angular increment gamma ($\gamma$), the edge of the structure may be considered to be straight, and not curved. Consequently, first and second sets of L-shaped fastening elements, as described in conjunction with FIG. 3, may be used within each of plural joining regions 360 subtending small azimuthal angle $\gamma$. In particular, a first set of fastening elements 534 of FIG. 5a have their shorter legs $534^2$ adhesively bonded to upper load-bearing face sheet 514 of lid 510, a first portion of their longer legs $534^1$ bonded to the inner load-bearing face sheet 526 of body 512, and another portion of their longer legs $534^1$ bonded to low-density core 518 of lid 510. Another set of fastening elements 536 has a portion of its longer legs $536^1$ affixed to the lower surface of face sheet 516 of lid 510, and another portion of the longer legs $536^1$ affixed to core 528 of cylindrical container 512, and has the shorter legs $536^2$ affixed to the outer surface 524 of container 512.

Figures 5B, 5C, 5D:
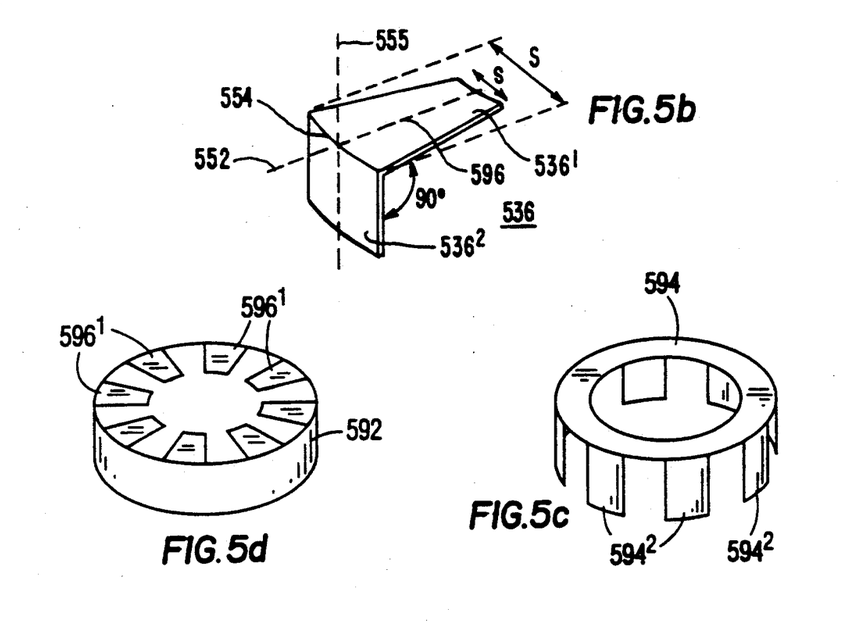

If it should be desired to reduce the number of fastening elements in FIG. 5a, the azimuthal angle $\gamma$ subtended by each fastening element may no longer be small enough to be considered as straight, whereupon the fastening pieces may be curved to match the curvature of the edge, so that the adhesive thickness may be kept roughly uniform across each joint. This curvature is illustrated in FIG. 5b, in which shorter leg $536^2$ is not planar, but instead has a curvature at least approximately matching that of the body of the surface to which it will be affixed. Bend 554 is curved, rather than being straight and orthogonal to axis 596 of elongation. Also, it may be desirable to taper the longer leg $536^1$ from a width S at a point adjacent to shorter leg $536^2$ to a lesser width s at the end remote from leg $536^2$, to provide extra clearance for fitting.

FIG. 5c illustrates an arrangement of an alternative fastening piece including a common annular leg 594 dimensioned to fit over lid 510 of FIG. 5a, with a plurality of serrations or legs $594^2$ depending therefrom, corresponding to legs $534^1$ of FIG. 5a. Such an arrangement reduces the number of parts required to assemble the panels of FIG. 5a, and reduces the need to adjust positions. FIG. 5d illustrates a corresponding fastening piece in the form of an annular cylinder 592, with a plurality of inwardly-facing legs $596^1$ affixed thereto. The inner diameter of cylinder 592 is dimensioned to fit around the upper edge of container 512 of FIG. 5a, for use with the arrangement of FIG. 5c to provide fastening with only two fastening elements.

Figures 6A, 6B, 6C:
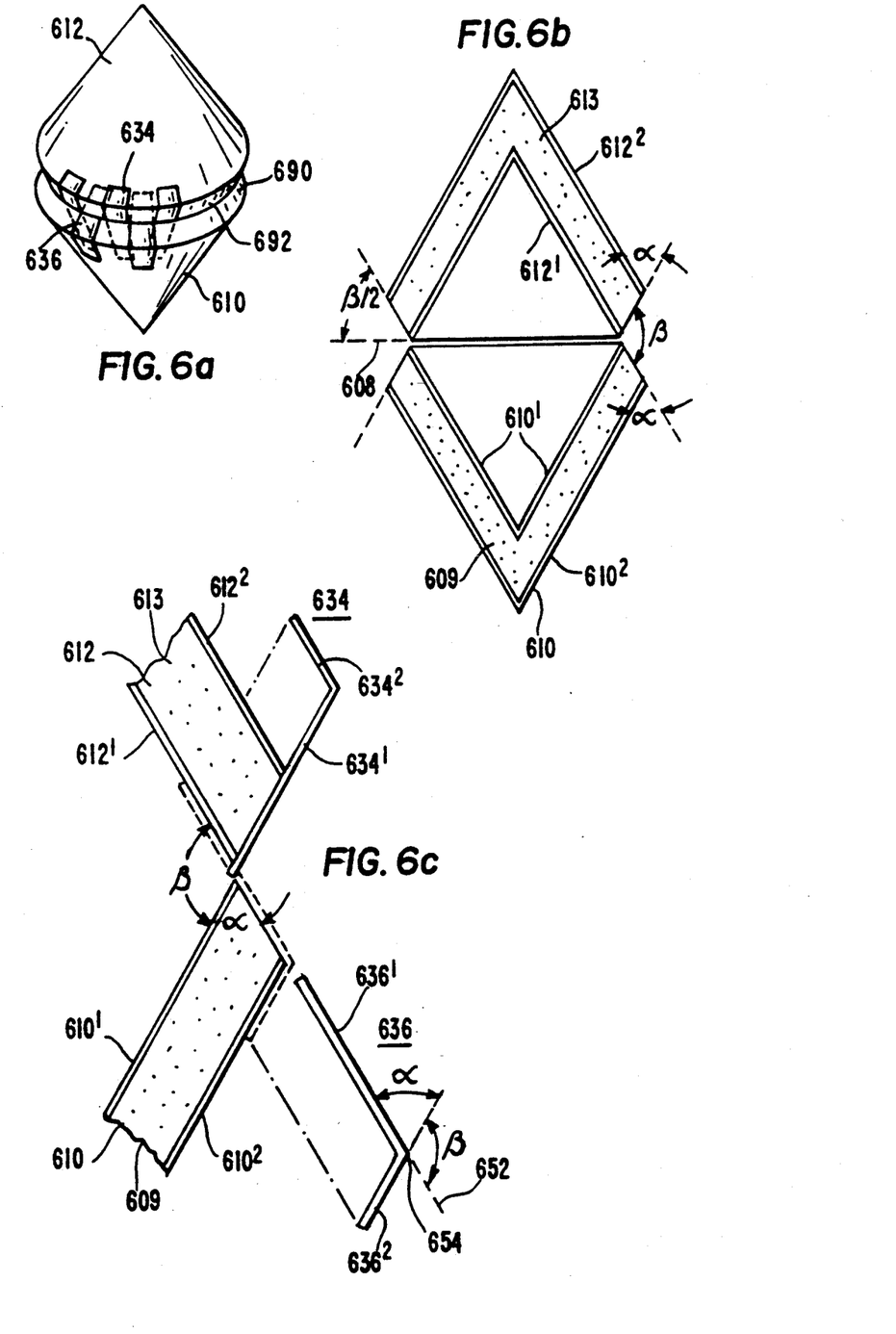
FIG. 6a illustrates the jointure of curved, skewed panels in accordance with an aspect of the invention, at the junction of a pair of conics.
FIG. 6b is a cross-section of the arrangement of FIG. 6a, illustrating certain angles.
FIG. 6c is an exploded, cross-sectional view of a portion of FIG. 6a, illustrating details of the joint assembly.

As so far described, both straight and curved edges have been illustrated as joined at right angles. It is also possible to join panels meeting at skew angles (other than 90°). FIG. 6a illustrates generally the fastening of a pair of conic sections 610 and 612, in which the curved walls meet at skew angles. A joint is desired along edges 690 and 692. FIG. 6b is a simplified cross-sectional representation of FIG. 6a, illustrating certain details. In particular, the skew angle between the panels 610 and 612 to be joined is illustrated by mutually supplemental (totalling 180°) angles $\alpha$ and $\beta$. The projection of inner face sheet $610^1$ of conic 610 intersects the projections of inner and outer face sheets $612^1$ and $612^2$, respectively, of conic 612, at an acute angle $\alpha$ and an obtuse angle $\beta$.

It should particularly be noted that the edges 690 and 692 of the panels 610 and 612, respectively, are formed or "cut" at other than a right angle (90°). In particular, by reference to FIG. 6b, the edge is "cut" at an angle of $\beta/2$ relative to a plane 608 of symmetry. This is necessary so that the longer straight leg of the joining pieces can be affixed to the exposed cores of the panels, as appropriate. FIG. 6c illustrates details of the joint. As illustrated in FIG. 6c, joining element 636 has its longer leg $636^1$ and shorter leg $636^2$ angularly separated by angles $\alpha$ and $\beta$, to correspond to the "planes" to which they are affixed. As mentioned, the curved surfaces may be considered to be planar over a small incremental angle ($\gamma$ not illustrated in FIG. 6) about the curve. Thus, leg $636^1$ is straight, and when in place lies parallel to face sheet $612^1$ of panel 612, and also lies parallel to the exposed edge of core 609 of panel 610. Shorter leg $636^2$ of fastening element 636 of FIG. 6c (or its projection) makes acute angle $\alpha$ and obtuse angle $\beta$ with longer leg $636^1$, so that, when affixed in position, shorter leg $636^2$ lies parallel to and abutting outer face sheet $610^2$ of conic 610.

Other embodiments of the invention will be apparent to those skilled in the art. For example, the load-bearing face sheets of each sandwich panel could be made from a strong plastic, and the core could be a structural foam. While adhesive fastening has been described, the same principles apply to joinder by metallurgic junctions.

What is claimed is:

1. A structure including a pair of sandwich panels joined together along edges, comprising:

first and second sandwich panels, each of said panels including first and second load-bearing face sheets, each defining a plane, said face sheets being held in a mutually parallel spaced-apart relationship by a core, each of said sandwich panels also including at least regions of an edge to be joined, the planes of said face sheets of said first panel making a particular angle with the planes of said face sheets of said second panel;

at least two joining pieces fastened to said first and second sandwich panels in said regions of said edges to be joined, each of said joining pieces being a thin, flat member elongated along an axis of elongation, each of said joining pieces including a bend of said member to define first and second thin, flat segments lying in planes separated by said particular angle, first ones of said joining pieces having said first segments affixed to said first face sheet of said first panel and to the exposed portion of said core of said second panel, and said second segments affixed to said second face sheet of said second panel, and second ones of said joining pieces, located adjacent to said first ones in regions to be joined adjacent to those of said first ones of said joining pieces, having first ones of said segments affixed to said first face sheet of said second panel and to said exposed core of said first panel, and said second segments affixed to said second face sheet of said first panel.

2. A structure according to claim 1, wherein at least one of said edges to be joined is straight.

3. A structure according to claim 1, wherein at least one of said edges to be joined is curved.

4. A structure according to claim 3, wherein said curved edge has a constant radius of curvature, and said regions of said edge to be joined are regions of azimuthal increments.

5. A structure according to claim 1 wherein said low density core is a honeycomb structure.

6. A structure according to claim 1, wherein said angle is 90°.

7. A structure according to claim 1, further comprising adhesive bonding means interposed between abutting portions of said joining pieces and said panels, for forming bonds therebetween; and spacing means (90) located within said adhesive bonding means for spacing said abutting portions for maintaining a minimum thickness of said adhesive bonding means.

8. A structure according to claim 1, wherein said angle between said face sheets of said first and second panels equals the supplement of the angle between (a) the exposed face of said core of said first panel at said edge to be joined, and (b) the planes of said face sheets of said first panel.

9. A structure according to claim 1, wherein said core has a low density by comparison with said face sheets.

10. A structure comprising:

first and second sandwich panels, each comprising first and second planar face sheets held in spaced-apart, mutually parallel relationship by a low-density core defining a thickness dimension between its associated face sheets, said first and second sandwich panels being juxtaposed along an edge to be joined, with the planes defined by said first sheets of said panels mutually orthogonal, said edges to be joined of said first and second panels having said cores exposed, the exposed surfaces of said core of said first panel defining a plane orthogonal to said plane defined by said first face sheets of said first panel; and at least first and second joining pieces attached to said first and second panels along said edge to be joined, each of said joining pieces comprising a thin, flat L-shaped structure with first and second mutually orthogonal legs, said first legs being longer than said second legs by said thickness dimension of said core, said first joining piece having said first leg affixed to said first load-bearing sheet of said first panel and to said exposed core of said second panel, and said second leg affixed to said first load bearing sheet of said second panel in a first region along said edge to be joined, and said second joining piece having said first leg fastened to said second load-bearing sheet of said second panel and to said exposed core of said first panel, and said second leg affixed to said second load-bearing sheet of said first panel in a second region along said edge to be joined, adjacent to said first region, whereby said first legs of said first and second joining pieces cross at right angles.

11. A structure according to claim 10, further comprising a third joining piece identical to said first joining piece, said third joining means having its first leg affixed to said first load-bearing sheet of said first panel and to said exposed core of said second panel, and said second leg affixed to said first load-bearing sheet of said second panel in a third region along said edge to be joined, adjacent said second region to be joined, and more remote from said first region to be joined than said second region to be joined.

* * * * *